(12) United States Patent  
Stetson et al.

(10) Patent No.: US 8,361,321 B2
(45) Date of Patent: Jan. 29, 2013

(54) PERFORATED GRAPHENE DEIONIZATION OR DESALINATION

(75) Inventors: John B. Stetson, New Hope, PA (US); Jonathan Mercurio, Moorestown, NJ (US); Alan Rosenwinkel, Haddonfield, NJ (US); Peter V. Bedworth, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 336 days.

(21) Appl. No.: 12/868,150

(22) Filed: Aug. 25, 2010

(65) Prior Publication Data

US 2012/0048804 A1  Mar. 1, 2012

(51) Int. Cl.
*B01D 61/00* (2006.01)
*B01D 63/00* (2006.01)

(52) U.S. Cl. .............. 210/652; 210/653; 210/257.2; 210/321.75

(58) Field of Classification Search ......... 210/651–653, 210/490, 500.25, 321.6, 321.75, 195, 257.2; 977/742, 752, 902; 204/154–156; 428/99, 428/166
See application file for complete search history.

(56) References Cited

U.S. PATENT DOCUMENTS

| | | | |
|---|---|---|---|
| 5,425,858 A | 6/1995 | Farmer | |
| 5,636,437 A | 6/1997 | Kaschmitter et al. | |
| 5,731,360 A | 3/1998 | Pekala et al. | |
| 5,902,762 A * | 5/1999 | Mercuri et al. | 501/99 |
| 5,932,185 A | 8/1999 | Pekala et al. | |
| 5,954,937 A | 9/1999 | Farmer | |
| 5,980,718 A | 11/1999 | Van Konynenburg et al. | |
| 6,309,532 B1 | 10/2001 | Tran et al. | |
| 6,346,187 B1 | 2/2002 | Tran et al. | |
| 6,462,935 B1 | 10/2002 | Shiue et al. | |
| 6,580,598 B2 | 6/2003 | Shiue et al. | |
| 6,659,298 B2 | 12/2003 | Wong | |
| 6,661,643 B2 | 12/2003 | Shiue et al. | |
| 7,138,042 B2 | 11/2006 | Tran et al. | |
| 7,175,783 B2 | 2/2007 | Curran | |
| 7,267,753 B2 | 9/2007 | Anex et al. | |
| 7,459,121 B2 * | 12/2008 | Liang et al. | 264/555 |
| 7,505,250 B2 | 3/2009 | Cho et al. | |
| 7,600,567 B2 * | 10/2009 | Christopher et al. | 166/275 |
| 7,706,128 B2 | 4/2010 | Bourcier | |
| 7,761,809 B2 | 7/2010 | Bukovec et al. | |
| 2005/0189673 A1 * | 9/2005 | Klug et al. | 264/137 |
| 2009/0294300 A1 * | 12/2009 | Kanzius et al. | 205/687 |

(Continued)

OTHER PUBLICATIONS

Liu, Li et al., "Graphene Oxidation: Thickness-Dependent Etching and Strong Chemical Doping"; Nano Letters 2008; vol. 8, No. 7, Jun. 9, 2008, pp. 1965-1970.

(Continued)

*Primary Examiner* — Ana Fortuna
(74) *Attorney, Agent, or Firm* — Renner Kenner Greive Bobak Taylor & Weber

(57) ABSTRACT

A separation arrangement isolates chlorine, sodium and possibly other ions from water. The ion-laden water is applied to at least one graphene sheet perforated with apertures dimensioned to pass water molecules and to not pass the smallest relevant ion. The deionized water flowing through the perforated graphene sheet is collected. The ions which are not passed can be purged. In another embodiment, the ion-laden water is applied to a first graphene sheet perforated with apertures dimensioned to block chlorine ions and through a second graphene sheet perforated with apertures dimensioned to block sodium ions. The concentrated chlorine and sodium ions accumulating at the first and second perforated graphene sheets can be separately harvested.

21 Claims, 6 Drawing Sheets

U.S. PATENT DOCUMENTS

| | | | |
|---|---|---|---|
| 2010/0025330 A1* | 2/2010 | Ratto et al. | 210/651 |
| 2010/0127312 A1* | 5/2010 | Grebel et al. | 257/288 |
| 2010/0167551 A1* | 7/2010 | DeDontney | 438/758 |
| 2012/0048804 A1* | 3/2012 | Stetson et al. | 210/653 |
| 2012/0183738 A1* | 7/2012 | Zettl et al. | 428/166 |

OTHER PUBLICATIONS

Kim, Myungwoong et al.;, "Fabrication and Characterization of Large-Area, Semiconducting Nanoperforated Graphene Materials"; Nano Letters 2010, vol. 10, No. 4, Mar. 1, 2010, pp. 1125-1131.

Bae, Sukang et al.; "Roll-to-roll production of 30-inch graphene films for transparent electrodes"; Nature Nanotechnology; vol. 5, Jun. 20, 2010; pp. 574-578.

Morse, Jeff; "Review of Kim, Myungwoong et al.;, Fabrication and Characterization of Large-Area, Semiconducting Nanoperforated Graphene Materials"; InterNano Resources for Nanomanufacturing; Apr. 30, 2010.

International Search Report dated Jan. 5, 2012 for related application PCT/US 11/47800.

* cited by examiner

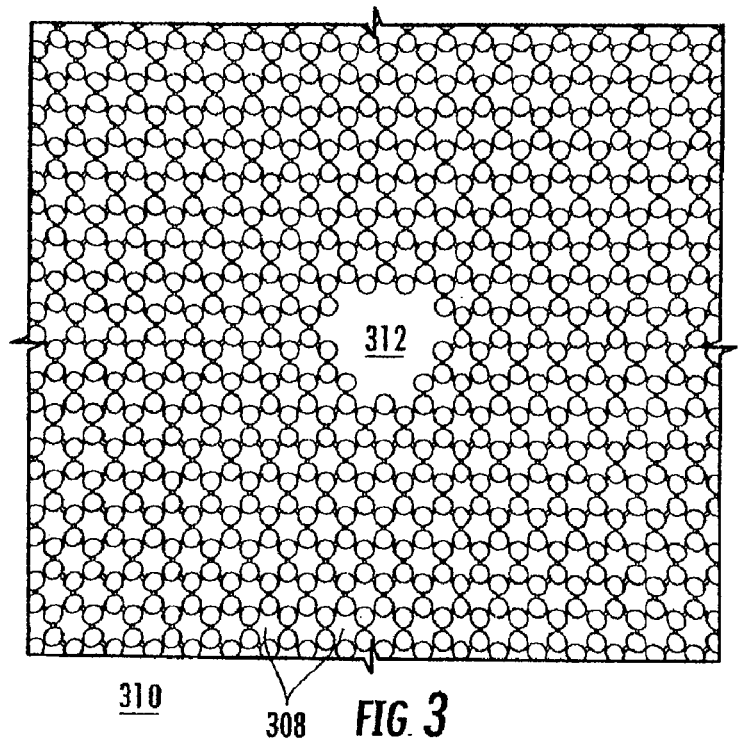
310  308  *FIG. 3*
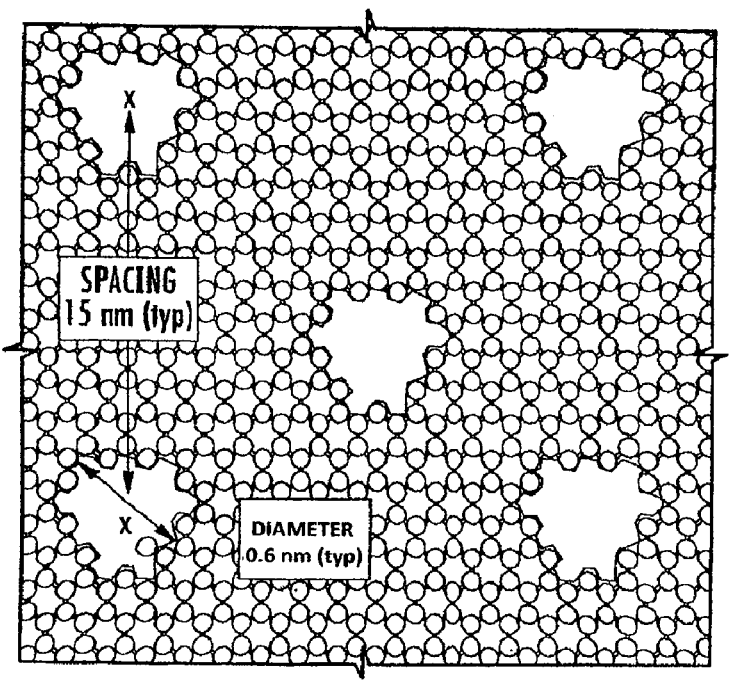
*FIG. 4*

PERFORATED GRAPHENE DEIONIZATION OR DESALINATION

BACKGROUND

As fresh water resources are becoming increasingly scarce, many nations are seeking solutions that can convert water that is contaminated with salt, most notably seawater, into clean drinking water.

Existing techniques for water desalination fall into four broad categories, namely distillation, ionic processes, membrane processes, and crystallization. The most efficient and most utilized of these techniques are multistage flash distillation (MSF), multiple effect evaporation (MEE) and reverse osmosis (RO). Cost is a driving factor for all of these processes, where energy and capital costs are both significant. Both RO and MSF/MEE technologies are thoroughly developed. Currently, the best desalination solutions require between two and four times the theoretical minimum energy limit established by simple evaporation of water, which is in the range of 3 to 7 kjoules/kg. Distillation desalination methods include multistage flash evaporation, multiple effect distillation, vapor compression, solar humidification, and geothermal desalination. These methods share a common approach, which is the changing of the state of water to perform desalination. These approaches use heat-transfer and/or vacuum pressure to vaporize saline water solutions. The water vapor is then condensed and collected as fresh water. Ionic process desalination methods focus on chemical and electrical interactions with the ions within the solution. Examples of ionic process desalination methods include ion exchange, electro-dialysis, and capacitive deionization. Ion exchange introduces solid polymeric or mineral ion exchangers into the saline solution. The ion exchangers bind to the desired ions in solution so that they can be easily filtered out. Electro-dialysis is the process of using cation and anion selective membranes and voltage potential to create alternating channels of fresh water and brine solution. Capacitive deionization is the use of voltage potential to pull charged ions from solution, trapping the ions while allowing water molecules to pass. Membrane desalination processes remove ions from solution using filtration and pressure. Reverse osmosis (RO) is a widely used desalination technology that applies pressure to a saline solution to overcome the osmotic pressure of the ion solution. The pressure pushes water molecules through a porous membrane into a fresh water compartment while ions are trapped, creating high concentration brine solution. Pressure is the driving cost factor for these approaches, as it is needed to overcome osmotic pressure to capture the fresh water. Crystallization desalination is based on the phenomenon that crystals form preferentially without included ions. By creating crystallized water, either as ice or as a methyl hydrate, pure water can be isolated from dissolved ions. In the case of simple freezing, water is cooled below its freezing point, thereby creating ice. The ice is then melted to form pure water. The methyl hydrate crystallization processed uses methane gas percolated though a saltwater solution to form methane hydrate, which occurs at a lower temperature than at which water freezes. The methyl hydrate rises, facilitating separation, and is then warmed for decomposition into methane and desalinated water. The desalinated water is collected, and methane is recycled.

Evaporation and condensation for desalination is generally considered to be energy efficient, but requires a source of concentrated heat. When performed in large scale, evaporation and condensation for desalination are generally co-located with power plants, and tend to be restricted in geographic distribution and size.

Capacitive deionization is not widely used, possibly because the capacitive electrodes tend to foul with removed salts and to require frequent service. The requisite voltage tends to depend upon the spacing of the plates and the rate of flow, and the voltage can be a hazard.

Reverse osmosis (RO) filters are widely used for water purification. The RO filter uses a porous or semipermeable membrane typically made from cellulose acetate or polyimide thin-film composite, typically with a thickness of 1 mm. These material are hydrophilic. The membrane is often spiral-wound into a tube-like form for convenient handling and membrane support. The membrane exhibits a random-size aperture distribution, in which the maximum-size aperture is small enough to allow passage of water molecules and to disallow or block the passage of ions such as salts dissolved in the water. Notwithstanding the one-millimeter thickness of a typical RO membrane, the inherent random structure of the RO membrane defines long and circuitous or tortuous paths for the water that flows through the membrane, and these paths may be much more than one millimeter in length. The length and random configuration of the paths require substantial pressure to strip the water molecules at the surface from the ions and then to move the water molecules through the membrane against the osmotic pressure. Thus, the RO filter tends to be energy inefficient.

FIG. 1 is a notional illustration of a cross-section of an RO membrane 10. In FIG. 1, membrane 10 defines an upstream surface 12 facing an upstream ionic aqueous solution 16 and a downstream surface 14. The ions that are illustrated on the upstream side are selected as being sodium (Na) with a + charge and chlorine (Cl) with a − charge. The sodium is illustrated as being associated with four solvating water molecules ($H_2O$). Each water molecule includes an oxygen atom and two hydrogen (H) atoms. One of the pathways 20 for the flow of water in RO membrane 10 of FIG. 1 is illustrated as extending from an aperture 20u on the upstream surface 12 to an aperture 20d on the downstream surface 14. Path 20 is illustrated as being convoluted, but it is not possible to show the actual tortuous nature of the typical path. Also, the path illustrated as 20 can be expected to be interconnected with multiple upstream apertures and multiple downstream apertures. The path(s) 20 through the RO membrane 10 are not only convoluted, but they may change with time as some of the apertures are blocked by unavoidable debris.

Alternative water desalination or deionization is desired.

SUMMARY

A separation arrangement isolates chlorine, sodium and other ions from water. The ion-laden water is applied to at least one graphene sheet perforated with apertures dimensioned to pass water molecules and to not pass the smallest relevant ion. The deionized water flowing through the perforated graphene sheet is collected. The ions which are not passed can be purged. In another embodiment, the ion-laden water is applied to a first graphene sheet perforated with apertures dimensioned to block chlorine ions and through a second graphene sheet perforated with apertures dimensioned to block sodium ions. The concentrated chlorine and sodium ions accumulating at the first and second perforated graphene sheets can be separately harvested.

A method for deionizing water carrying unwanted ions comprises the steps of perforating a sheet of graphene with plural apertures selected to allow the passage of water molecules and to disallow the passage of a selected one of the unwanted ions, to thereby generate perforated graphene. As an alternative, a sheet of graphene so perforated can be provided. The water carrying unwanted ions is pressurized to thereby generate pressurized water. The pressurized water is applied to a first surface of the perforated graphene, so that water molecules flow to a second side of the perforated graphene sheet in preference to ions. The water molecules are collected from the second side of the graphene sheet. In one mode of this method, the selected one of the ions is chlorine, the apertures for disallowance of the chlorine ions are nominally of 0.9 nanometers diameter, and the apertures are nominally spaced apart by fifteen nanometers. In another mode of this method, the selected one of the ions is sodium, and the apertures for disallowance of the sodium ions of nominally 0.6 nanometers diameter, and the apertures are nominally spaced apart by fifteen nanometers. The method may include the step of reinforcing the sheet of perforated graphene with a backing of a polytetrafluoroethylene grid.

A method for deionizing water carrying unwanted ions comprises the steps of perforating a first sheet of graphene with plural apertures of a diameter selected to disallow the passage of a selected first one of the unwanted ions, and to allow the passage of water molecules laden with a selected second one of the unwanted ions, to thereby generate a first sheet of perforated graphene. A second sheet of graphene is perforated with plural apertures selected to allow the passage of water molecules and to disallow the passage of the selected second one of the unwanted ions, to thereby generate a second sheet of perforated graphene in which the apertures have a smaller diameter than the apertures of the first sheet of perforated graphene. The first and second sheets of perforated graphene are juxtaposed, to thereby form a juxtaposed sheet with a first side defined by the first sheet of perforated graphene, a second side defined by the second sheet of perforated graphene, and a path for the flow of liquid therebetween. The water carrying unwanted ions is applied to the first side of the juxtaposed sheet, so that water molecules flow through the juxtaposed sheet and the path to the second side of the juxtaposed sheet in preference to ions, to thereby produce nominally deionized water. The nominally deionized water molecules are collected from the second side of the juxtaposed sheet.

A water deionizer comprises a graphene sheet perforated with apertures dimensioned to allow the flow of water molecules and to disallow the flow of ions of a particular type. A source of water laden with ions of the particular type is provided. A path is provided for the flow of the water laden with ions of the particular type through the graphene sheet perforated with apertures. In a particular embodiment of this deionizer, a purge arrangement is coupled to the path for the flow, for diverting the flow away from the graphene sheet perforated with apertures.

A separator comprises a first graphene sheet perforated with apertures dimensioned to allow the flow of water molecules and to disallow the flow of ions of a first type, and a second graphene sheet perforated with apertures dimensioned to allow the flow of water molecules and to disallow the flow of ions of a second type, where the ions of the second type are smaller than the ions of the first type. A source is provided of water laden with ions of the first and second types. A path is provided for applying a flow of the water laden with ions of the first and second types to the first graphene sheet perforated with apertures dimensioned to disallow the flow of the ions of the first type. As a result, (a) ions of the first type accumulate on an upstream side of the first graphene sheet perforated with apertures dimensioned to disallow the flow of the ions of the first type and (b) water laden with ions of the second type flows through the first graphene sheet perforated with apertures dimensioned to disallow the flow of the ions of the first type to a downstream side of the first graphene sheet perforated with apertures dimensioned to disallow the flow of the ions of the first type. The separator further comprises a path for applying a flow of the water laden with ions of the second type to an upstream side of the graphene sheet perforated with apertures dimensioned to disallow the flow of the ions of the first type. As a result, (a) ions of the second type accumulate on an upstream side of the second graphene sheet perforated with apertures dimensioned to disallow the flow of the ions of the second type and (b) water free of the ions of the first and second types flows through the second graphene sheet perforated with apertures dimensioned to disallow the flow of the ions of the second type. A collection arrangement is coupled to receive the water free of the ions of the first and second types. A further collection arrangement may be provided for separately collecting accumulations of ions.

BRIEF DESCRIPTION OF THE DRAWINGS

FIG. 3 is a plan representation of a perforated graphene sheet which may be used in the arrangement of FIG. 2, showing the shape of one of the plural apertures;

FIG. 4 is a plan view of a perforated graphene sheet, showing 0.6 nanometer diameter perforations or apertures and interperforation dimensions;

DETAILED DESCRIPTION

Figure 1:
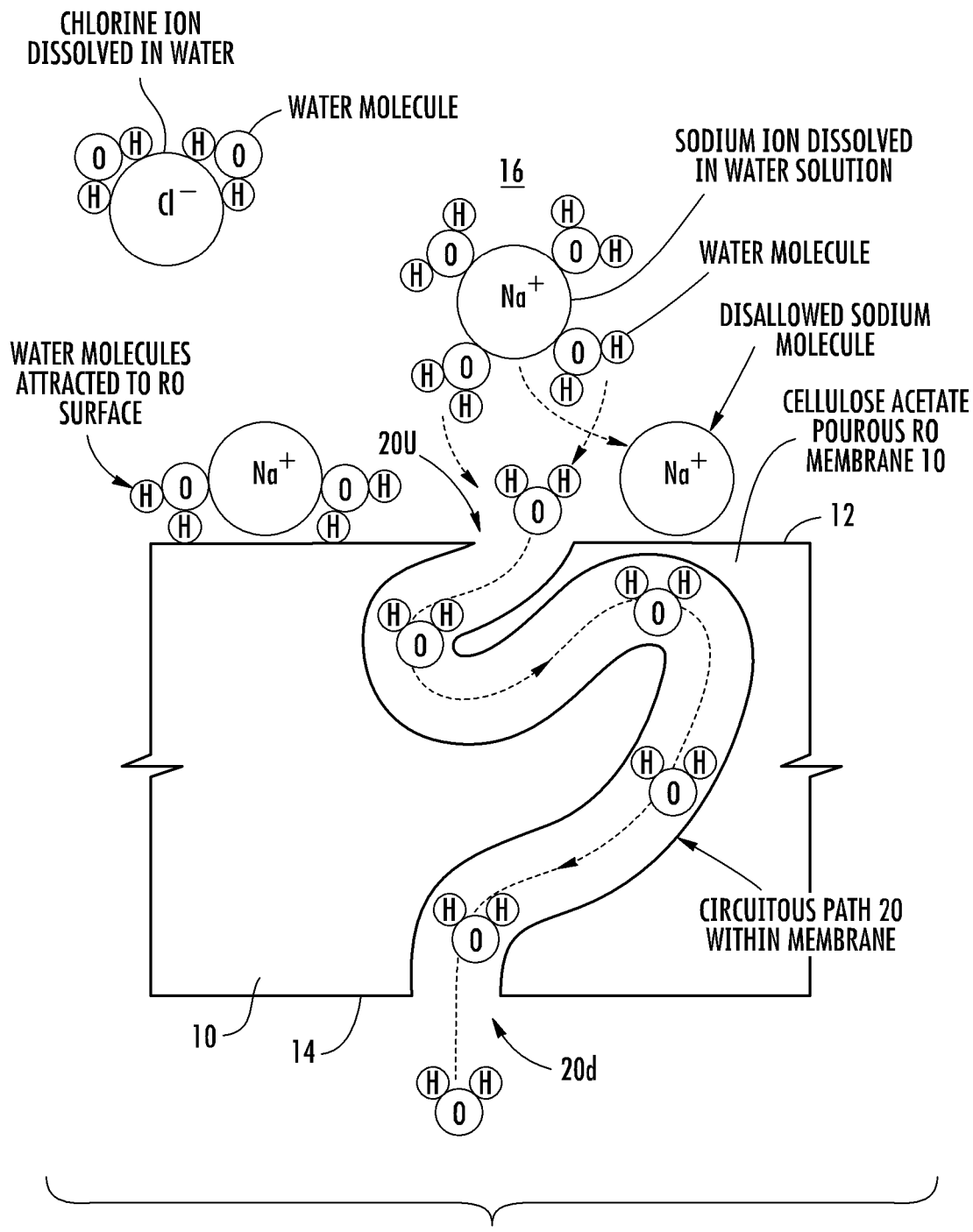
FIG. 1 is a notional cross-sectional representation of a prior art reverse osmosis (RO) filter membrane.
Figure 2:
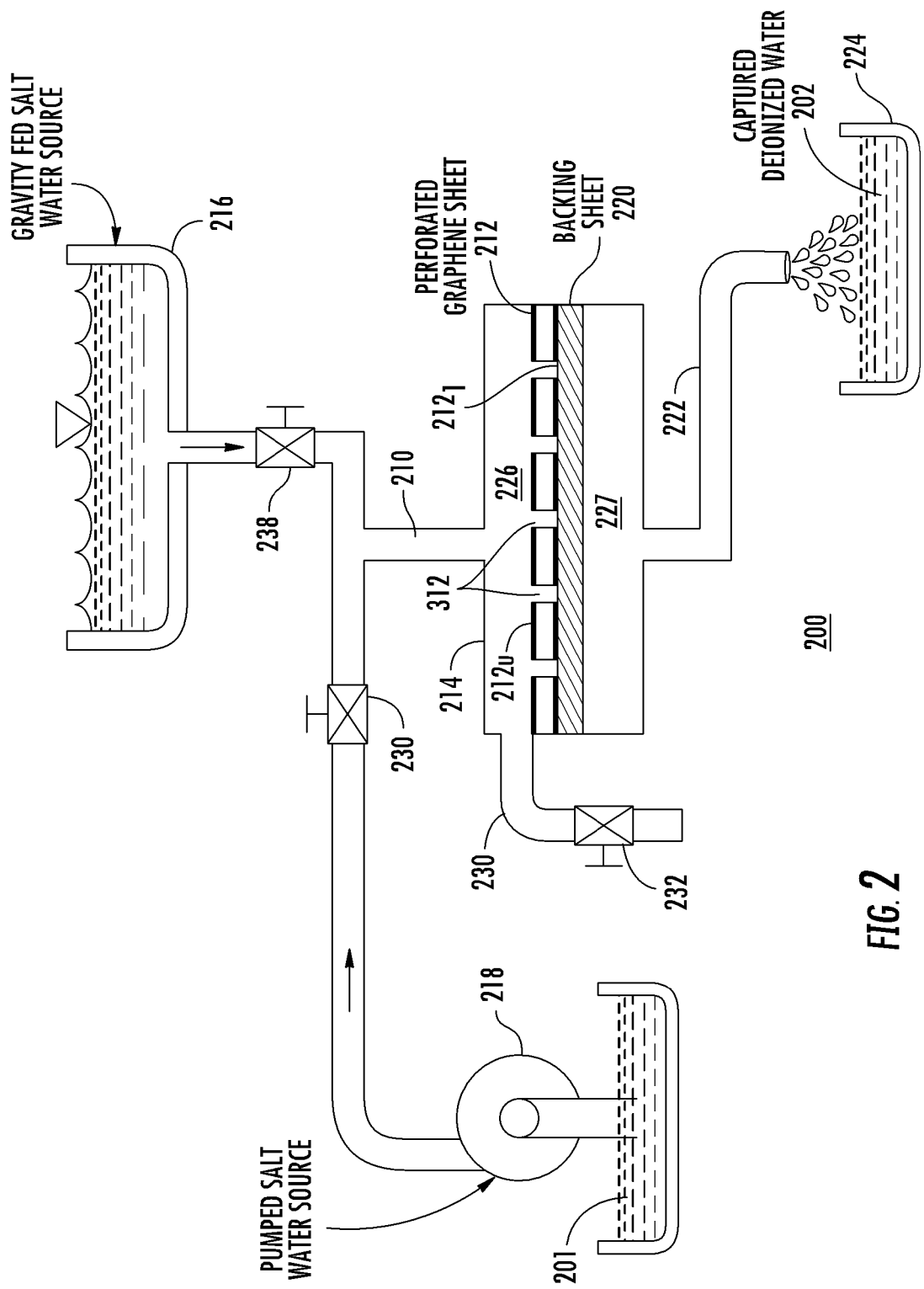
FIG. 2 is a notional representation of a water filter according to an aspect of the disclosure, using a perforated graphene sheet.

FIG. 2 is a notional representation of a basic desalination, desalinization or deionization apparatus 200 according to an exemplary embodiment or aspect of the disclosure. In FIG. 2, a channel 210 conveys ion-laden water to a filter membrane 212 mounted in a supporting chamber 214. The ion-laden water may be, for example, seawater or brackish water. In one exemplary embodiment, the filter membrane 212 can be wound into a spiral in known manner. Flow impetus or pressure of the ion-laden water flowing through channel 210 of FIG. 2 can be provided either by gravity from a tank 216 or from a pump 218. Valves 236 and 238 allow selection of the source of ion-laden water. In apparatus or arrangement 200, filter membrane 212 is a perforated graphene sheet. Graphene is a single-atomic-layer-thick layer of carbon atoms, bound together to define a sheet 310, as illustrated in FIG. 3. The thickness of a single graphene sheet is approximately 2 nanometers (nm). Multiple graphene sheets can be formed, having greater thickness. The carbon atoms of the graphene sheet 310 of FIG. 3 define a repeating pattern of hexagonal ring structures (benzene rings) constructed of six carbon atoms, which form a honeycomb lattice of carbon atoms. An interstitial aperture 308 is formed by each six carbon atom ring structure in the sheet and this interstitial aperture is less than one nanometer across. This dimension is much too small to allow the passage of either water or ions. In order to form the perforated graphene sheet 212 of FIG. 2, one or more perforations are made, as illustrated in FIG. 3. A representative generally or nominally round aperture 312 is defined through the graphene sheet 310. Aperture 312 has a nominal diameter of about 0.6 nanometers. The 0.6 nanometer dimension is selected to block the smallest of the ions which would ordinarily be expected in salt or brackish water, which is the sodium ion. The generally round shape of the aperture 312 is affected by the fact that the edges of the aperture are defined, in part, by the hexagonal carbon ring structure of the graphene sheet 310.

Aperture 312 may be made by selective oxidation, by which is meant exposure to an oxidizing agent for a selected period of time. It is believed that the aperture 312 can also be laser-drilled. As described in the publication Nano Lett. 2008, Vol. 8, no. 7, pg 1965-1970, the most straightforward perforation strategy is to treat the graphene film with dilute oxygen in argon at elevated temperature. As described therein, through apertures or holes in the 20 to 180 nm range were etched in graphene using 350 mTorr of oxygen in 1 atmosphere (atm) argon at 500° C. for 2 hours. The paper reasonably suggests that the number of holes is related to defects in the graphene sheet and the size of the holes is related to the residence time. This is believed to be the preferred method for making the desired perforations in graphene structures. The structures may be graphene nanoplatelets and graphene nanoribbons. Thus, apertures in the desired range can be formed by shorter oxidation times. Another more involved method as described in Kim et al "Fabrication and Characterization of Large Area, Semiconducting Nanoperforated Graphene Materials," Nano Letters 2010 Vol. 10, No. 4, Mar. 1, 2010, pp 1125-1131 utilizes a self assembling polymer that creates a mask suitable for patterning using reactive ion etching. A P(S-blockMMA) block copolymer forms an array of PMMA columns that form vias for the RIE upon redeveloping. The pattern of holes is very dense. The number and size of holes is controlled by the molecular weight of the PMMA block and the weight fraction of the PMMA in the P(S-MMA). Either method has the potential to produce perforated graphene sheets.

As mentioned, the graphene sheet 310 of FIG. 3 has a thickness of but a single atom. Thus, the sheet tends to be flexible. The flex of the graphene sheet can be ameliorated by applying a backing structure to the sheet 212. In FIG. 2, the backing structure of perforated graphene sheet 212 is illustrated as 220. Backing structure 220 in this embodiment is a sheet of perforated polytetrafluoroethylene, sometimes known as polytetrafluoroethane. A thickness of the backing sheet may be, for example, one millimeter (mm).

It should be noted that, in the apparatus or arrangement of FIG. 2, the pressure of ion-laden water applied through path 210 to the perforated membrane 212 can be provided by gravity from tank 216, thereby emphasizing one of the aspects of the apparatus 200. That is, unlike the RO membrane, the perforated graphene sheet 312 forming the perforated membrane 212 is hydrophobic, and the water passing through the pierced apertures (312 of FIG. 3A) is not impeded by the attractive forces attributable to wetting. Also, as mentioned, the length of the flow path through the apertures 312 in graphene sheet 310 is equal to the thickness of the sheet, which is about 2 nm. This length is much less than the lengths of the random paths extending through a RO membrane. Consequently, very little pressure is required to provide fluid flow, or conversely, the flow at a given pressure is much greater in the perforated graphene sheet 310. This, in turn, translates to a low energy requirement for ion separation. It is believed that the pressure required in a RO membrane to force water through the membrane against osmotic pressure includes a frictional component which results in heating of the membrane. Consequently, some of the pressure which must be applied to the RO membrane does not go toward overcoming osmotic pressure, but instead goes into heat. Simulated results show that the perforated graphene sheet reduces the required pressure by at least a factor of five. Thus, where an RO membrane might require forty pounds per square inch (PSI) of pressure on the upstream side to effect a particular flow of deionized water at a particular ion concentration, a perforated graphene sheet for the same flow rate may require eight PSI or less.

As mentioned, the perforations 312 in graphene sheet 212 of FIG. 2 (or equivalently graphene sheet 310 of FIG. 3) are dimensioned to disallow the passage of the smallest ions to be expected in the source water. Consequently, any ions equal to or larger in size than the smallest will not pass through the perforated graphene sheet 212, and such ions can be expected to accumulate in an upstream side 226 of the graphene-sheet-supporting chamber 214. This accumulation of ions in upstream "chamber" 226 is referred to herein as "sludge," and will eventually reduce the flow of water through the perforated graphene sheet 212, thereby tending to render it ineffective for deionization. As illustrated in FIG. 2, a further path 230 is provided, together with a discharge valve 232, to allow purging or discharge of the sludge. Thus, operation of the apparatus or arrangement 200 of FIG. 2 may be in a "batch" mode. The first mode of the batch operation occurs with flow of ion-laden water through path 210, with discharge valve 232 closed to prevent flow. The ion-laden water fills the upstream side 226 of the support chamber 214. The water molecules are allowed to flow through perforated graphene sheet 212 of FIG. 2 and through the backing sheet 220 to the downstream side 227 of the support chamber 214. Thus, deionized water accumulates in downstream portion 227 for a period of time, and is available to be drawn off through a path 222 to a capture vessel illustrated as a tank 224. Eventually, the accumulation or concentration of ions in upstream portion 226 of the support chamber will tend to reduce the flow of water through the perforated graphene sheet 212. In order to purge the concentrated ion/water mix accumulated on or in the upstream chamber or side 226, valve 232 is opened, which allows the concentrated ion/water mix to be purged while the upstream portion 226 refills with ion-laden water from tank 216 or pump 218. Valve 232 is then closed and another filtration cycle begins. This results in the production of deionized water and accumulation of the deionized water in container 224.

FIG. 4 is a representation of a graphene sheet with a plurality of perforations such as that of FIG. 3. The sheet of FIG. 4 defines [three, four, or five] apertures. In principle, the flow rate will be proportional to the aperture density. As the aperture density increases, the flow through the apertures may become "turbulent," which may adversely affect the flow at a given pressure. Also, as the aperture density increases, the strength of the underlying graphene sheet may be locally reduced. Such a reduction in strength may, under some circumstances, result in rupture of the membrane. The center-to-center spacing between apertures is believed to be near optimum for the 0.6 nanometer apertures at a value of fifteen nanometers.

Figure 5:
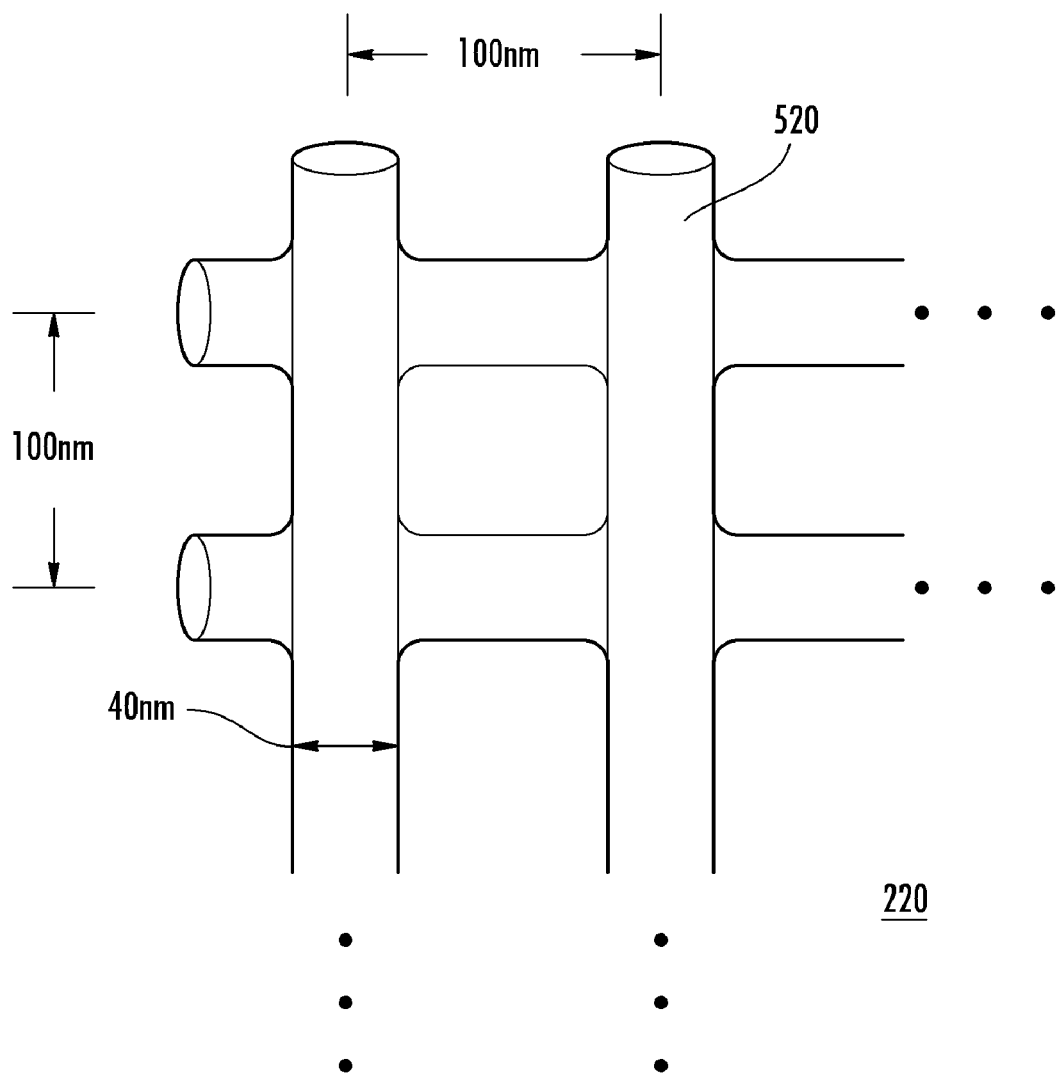
FIG. 5 is a plan representation of a backing sheet that may be used in conjunction with the perforated graphene sheet of FIG. 2.

FIG. 5 is a simplified illustration of the structure of a backing sheet which may be used with the graphene sheet of FIG. 2. In FIG. 5, backing sheet 220 is made from filaments 520 of polytetrafluoroethylene, also known as polytetrafluoroethane, arranged in a rectangular grid and bonded or fused at their intersections. As with the perforated graphene sheet, the dimensions in the backing sheet should be as large as possible for maximum flow, commensurate with sufficient strength. The spacing between mutually adjacent filaments 520 oriented in the same direction can be nominally 100 nm, and the filaments may have a nominal diameter of 40 nm. The tensile strength of the graphene sheet is great, and so the relatively large unsupported areas in the backing sheet should not present problems.

Figure 6:
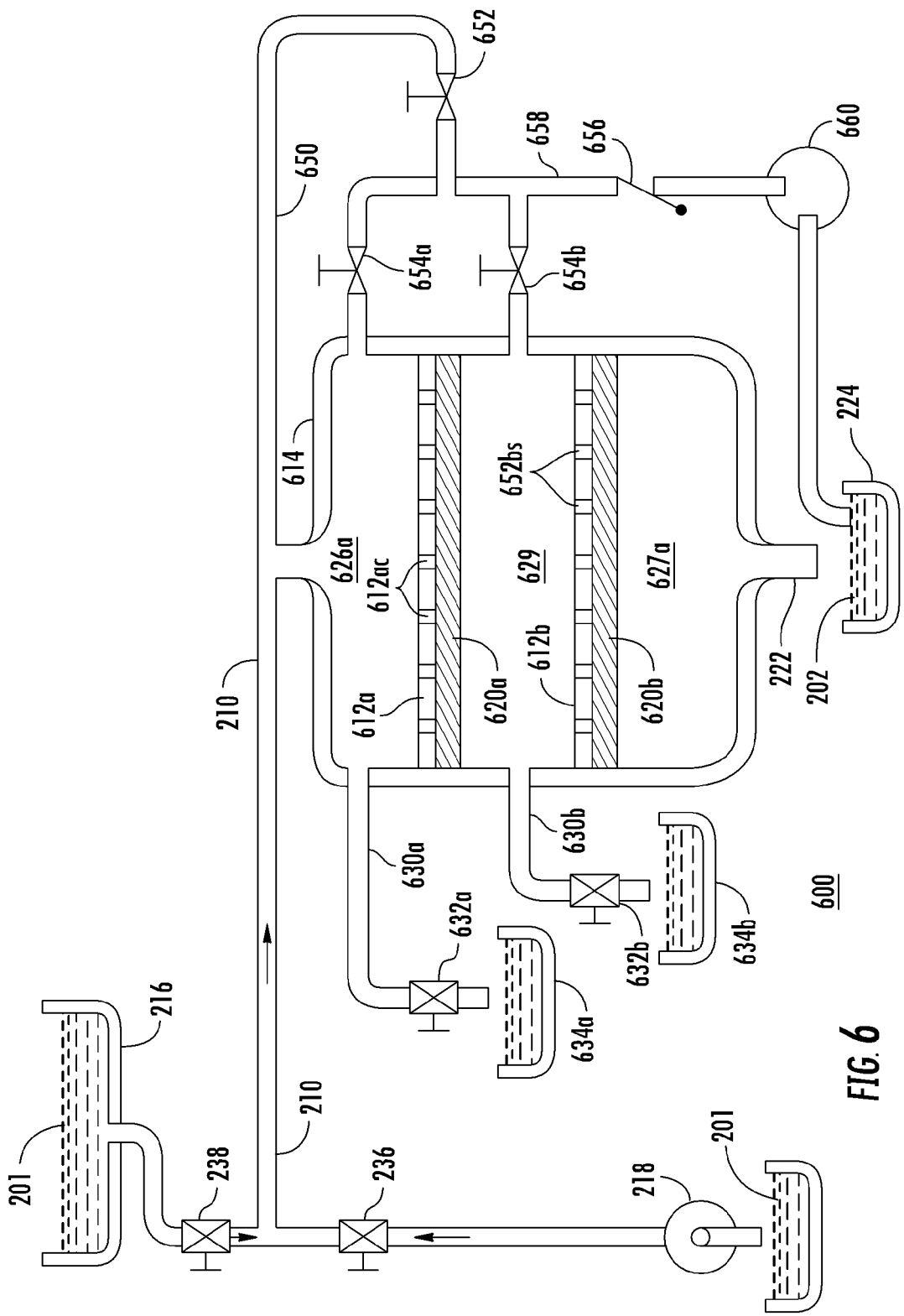
FIG. 6 is a notional representation of a water deionization filter according to aspects of the disclosure, using multiple perforated graphene sheets for separation of the concentrated ions.

FIG. 6 is a notional illustration of a deionization or desalination apparatus 600 according to another embodiment or aspect of the disclosure, in which multiple layers of differently-perforated graphene sheets are used. In FIG. 6, elements corresponding to those of FIG. 2 are designated by like reference alphanumerics. Within support chamber 614 of FIG. 6, upstream and downstream perforated graphene sheets 612a and 612b, respectively, divide the chamber into three volumes or portions, namely an upstream portion or chamber 626a, a downstream portion or chamber 626b, and an intermediate portion or chamber 629. Each perforated graphene sheet 612a and 612b is associated with a backing sheet. More particularly, perforated graphene sheet 612a is backed by a sheet 620a, and perforated graphene sheet 612b is backed by a sheet 620b. The perforations of the perforated graphene sheets 612a and 612b differ from one another. More particularly, upstream graphene sheet 612a is perforated by apertures 612ac selected to disallow or disable the flow of chlorine ions and to enable the flow of water laden with sodium ions; these apertures are 0.9 nanometers in nominal diameter. Thus, chlorine ions, having a greater effective diameter than 0.9 nanometers, cannot pass through perforated graphene sheet 612a, but remain in the upstream portion or chamber 626a. Water laden with sodium ions can flow through perforated graphene sheet 612a into intermediate chamber 629. Downstream perforated graphene sheet 612b is perforated with apertures 652bs selected to disallow or disable the flow of sodium ions and to enable the flow of water molecules; these apertures are 0.6 nanometers in nominal diameter. Thus, chlorine ions, having a greater effective diameter than 0.9 nanometers, cannot pass through apertures 612ac of perforated graphene sheet 612a, but water laden with sodium ions can flow through the apertures 612ac of perforated graphene sheet 612a into intermediate chamber 629. Sodium ions cannot pass through downstream perforated graphene sheet 612b, and so remain or accumulate in intermediate portion or chamber 629. The water molecules (H2O), free of at least chlorine and sodium ions, can flow from intermediate portion or chamber 629 through apertures 652bs of perforated graphene sheet 612b and into downstream portion or chamber 627a, from whence the deionized water can be collected through path 222 and collection vessel 224.

As with the case of the deionization arrangement 200 of FIG. 2, the apparatus or arrangement 600 of FIG. 6 accumulates or concentrates ions during deionization operation. Unlike the apparatus or arrangement of FIG. 2, however, deionizer 600 produces at least partially separated concentrations of ions. More particularly, with a flow of water laden with chlorine and sodium ions, upstream portion or chamber 626a of apparatus 600 accumulates a sludge concentration consisting principally of chlorine ions, and intermediate portion or chamber 629 accumulates a concentration principally of sodium ions. These concentrated ions can be separately extracted by selective control of purging connections 630a and 630b and their purge valves 632a and 632b, respectively. More particularly, valve 632a can be opened to allow the concentrated chlorine ions to flow from upstream portion or chamber 626a to a collecting vessel illustrated as a tank 634a, and valve 632b can be opened to allow the concentrated sodium ions to flow from intermediate portion or chamber 629 to a collecting vessel illustrated as a tank 634b. Ideally, purge valve 632a is closed before purging of intermediate portion or tank 629 is begun, so that some pressure is maintained across perforated graphene sheet 612a to provide a flow of water through perforated graphene sheet 612a to aid in flushing the sodium-ion-rich sludge from the intermediate chamber 629. Purge valves 632a and 632b are closed prior to proceeding with the deionization. The purged and collected concentrated ions have economic value, as for conversion into solid form in the case of sodium or gaseous form in the case of chlorine. It should be noted that sea water contains significant amounts of beryllium salts, and these salts, if preferentially concentrated, have value to the pharmaceutical industry as a catalyst.

Also illustrated in FIG. 6 are cross-flow valves 654a and 654b, communicating between a flow path 658 and upstream portion or chamber 626a and intermediate portion or chamber 626b, respectively. Unfiltered water 201 loaded with ions can be routed to flow path 658 by opening valve 652, or deionized water 202 can be provided from tank 224 by operating a pump 660. From pump 660, the deionized water flows through a check valve 656 to path 658. Cross-flow valves 654a and 654b are opened and closed simultaneously with purge valves 632a and 632b, respectively, to thereby aid in purging the sludge from the chambers.

Figure 7:
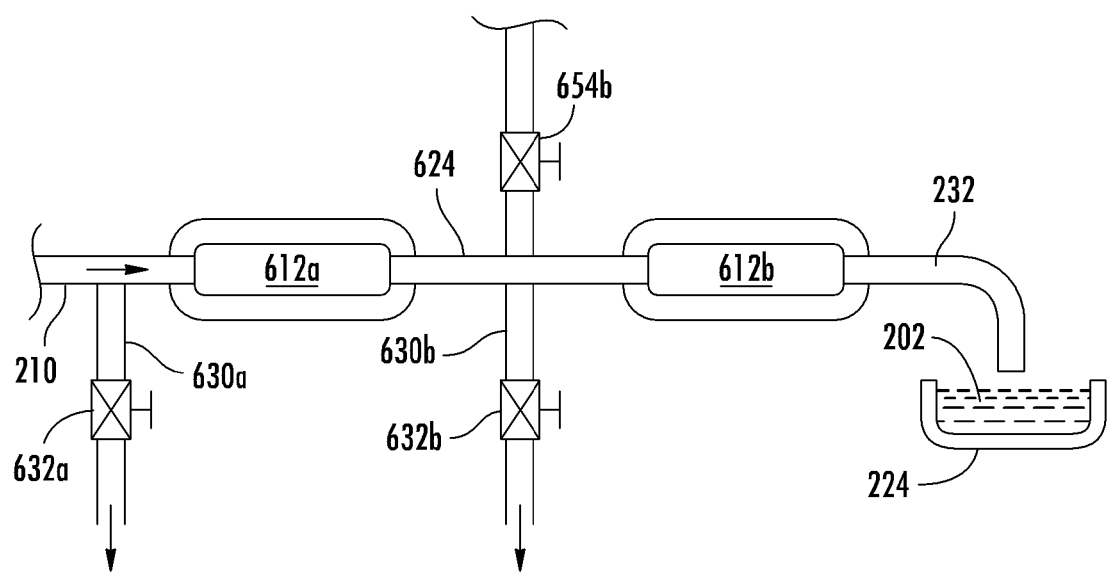
FIG. 7 is a simplified diagram illustrating a plumbing arrangement corresponding generally to the arrangement of FIG. 6, in which the perforated graphene sheets are spirally wound and enclosed in cylinders.

FIG. 7 is a simplified representation of a deionizing or ion separating arrangement according to an aspect of the disclosure. Elements of FIG. 7 corresponding to those of FIG. 6 are designated by like reference alphanumerics. In FIG. 7, the perforated graphene sheets 612a and 612b are rolled or spiral-wound into cylindrical form, and inserted into housings illustrated as 712a and 712b, respectively, as know from the RO membrane arts.

Those skilled in the art will understand that ions other than chlorine and sodium may be removed from water by selectively perforated graphene sheets.

A method for deionizing water carrying unwanted ions (201) comprises the steps of perforating a sheet of graphene (310) with plural apertures (such as 312) selected to allow the passage of water molecules and to disallow the passage of a selected one of the unwanted ions (Na, for example), to thereby generate perforated graphene (212). As an alternative, a graphene sheet so perforated may be provided. The water carrying unwanted ions (201) is pressurized (216, 218) to thereby generate pressurized water. The pressurized water is applied to a first (212u) surface of the perforated graphene (212), so that water molecules flow to a second side (212d) of the perforated graphene sheet in preference to ions. The water molecules (202) are collected at the second side (212d) of the graphene sheet. In one mode of this method, the selected one of the ions is chlorine, the apertures for disallowance of the chlorine ions are nominally of 0.9 nanometers diameter, and the apertures are nominally spaced apart by fifteen nanometers. In another mode of this method, the selected one of the ions is sodium, and the apertures for disallowance of the sodium ions of nominally 0.6 nanometers diameter, and the apertures' are nominally spaced apart by fifteen nanometers. The method may include the step of reinforcing the sheet of perforated graphene (212) with a backing (220), which may be a polytetrafluoroethylene grid (520).

A method for deionizing water (201) carrying unwanted ions comprises the steps of perforating a first sheet (612a) of graphene with plural apertures (312) of a diameter selected to disallow the passage of a selected first one of the unwanted ions (chlorine, for example), and to allow the passage of water molecules laden with a selected second one of the unwanted ions (sodium, for example), to thereby generate a first sheet of perforated graphene (612a). A second sheet of graphene (612b) is perforated with plural apertures selected to allow the passage of water molecules and to disallow the passage of the selected second one of the unwanted ions, to thereby generate a second sheet of perforated graphene (612b) in which the apertures have a smaller diameter than the apertures of the first sheet (612a) of perforated graphene. The first (612a) and second (612b) sheets of perforated graphene are juxtaposed, to thereby form a juxtaposed sheet with a first side defined by the first sheet (612a) of perforated graphene, a second side defined by the second sheet (612b) of perforated graphene, and a path (629) for the flow of liquid therebetween. The water carrying unwanted ions is applied to the first side (612a) of the juxtaposed sheet, so that water molecules flow through the juxtaposed sheet (612a) and the path (629) to the second side of the juxtaposed sheet in preference to ions, to thereby produce nominally deionized water. The nominally deionized water molecules are collected from the second side (612b) of the juxtaposed sheet.

A water deionizer comprises a graphene sheet (212) perforated with apertures (312) dimensioned to allow the flow of water molecules and to disallow the flow of ions of a particular type (sodium, for example). A source of water laden with ions of the particular type is provided. A path (210, 226, 227) is provided for the flow of the water laden with ions of the particular type through the graphene sheet perforated with apertures (212). In a particular embodiment of this deionizer, a purge arrangement (220,232) is coupled to the path for the flow, for diverting the flow away from the graphene sheet perforated with apertures (212).

A separator (600) comprises a first graphene sheet perforated with apertures dimensioned to allow the flow of water molecules and to disallow the flow of ions of a first type (612a), and a second graphene sheet perforated with apertures dimensioned to allow the flow of water molecules and to disallow the flow of ions of a second type (612b), where the ions of the second type (Na) are smaller than the ions of the first type (Cl). A source (210, 216, 218) is provided of water laden with ions of the first and second types (201). A path (210, 626a) is provided for applying a flow of the water laden with ions of the first and second types (201) to the first graphene sheet perforated with apertures dimensioned to disallow the flow of the ions of the first type (612a). As a result, (a) ions of the first type (Cl) accumulate on an upstream side (626a) of the first graphene sheet perforated with apertures dimensioned to disallow the flow of the ions of the first type (626a) and (b) water laden with ions of the second type (Na) flows through the first graphene sheet perforated with apertures dimensioned to disallow the flow of the ions of the first type (626a) to a downstream side (629) of the first graphene sheet perforated with apertures dimensioned to disallow the flow of the ions of the first type (612a). The separator (600) further comprises a path (629) for applying a flow of the water laden with ions of the second type to an upstream side of the graphene sheet perforated with apertures dimensioned to disallow the flow of the ions of the first type (612b). As a result, (a) ions of the second type accumulate on an upstream side (629) of the second graphene sheet perforated with apertures dimensioned to disallow the flow of the ions of the second type (612b) and (b) water free of the ions of the first and second types flows through the second graphene sheet perforated with apertures dimensioned to disallow the flow of the ions of the second type (612b). A collection arrangement (222, 224) is coupled to receive the water free of the ions of the first and second types (202). A further collection arrangement (630a, 632a, 634a; 630b, 632b, 634b) may be provided for separately collecting accumulations of ions.

What is claimed is:

1. A method for deionizing water carrying unwanted ions, said method comprising the steps of:
   providing a sheet of graphene with plural perforated apertures selected to allow the passage of water molecules and to disallow the passage of a selected one of said unwanted ions;
   pressurizing said water carrying unwanted ions to thereby generate pressurized water;
   applying said pressurized water to a first surface of said perforated graphene, so that water molecules flow to a second side of said perforated graphene sheet in preference to ions; and
   collecting said water molecules from said second side of said graphene sheet.

2. A method according to claim 1, wherein said selected one of said ions is chlorine, and said apertures for disallowance of said chlorine ions are nominally 0.9 nanometers.

3. A method according to claim 2, wherein said apertures are nominally spaced apart by 15 nanometers.

4. A method according to claim 1, wherein said selected one of said ions is sodium, and said apertures for disallowance of said sodium ions is nominally 0.6 nanometers.

5. A method according to claim 4, wherein said apertures are nominally spaced apart by 15 nanometers.

6. A method according to claim 1, further comprising the step of reinforcing said sheet of perforated graphene.

7. A method according to claim 6, wherein said step of reinforcing includes the step of backing.

8. A method according to claim 7, wherein said step of backing includes the step of backing with a grid.

9. A method according to claim 8, wherein the material of said grid is polytetrafluoroethylene.

10. A method according to claim 1, wherein said step of providing a sheet of graphene with plural apertures selected to allow the passage of water molecules and to disallow the passage of a selected one of said unwanted ions comprises the step of:
    applying oxidizer to at least a portion of said sheet of graphene to thereby generate said apertures.

11. A method according to claim 10, further comprising the step, before said step of applying oxidizer, of masking those portions of said graphene at which said apertures are not desired.

12. A method according to claim 1, further comprising:
    providing said graphene sheet with a thickness of approximately 2 nanometers.

13. A method for deionizing water carrying unwanted ions, said method comprising the steps of:
    providing a first sheet of graphene perforated with plural apertures of a diameter selected to disallow the passage of a selected first one of said unwanted ions, and to allow the passage of water molecules laden with a selected second one of said unwanted ions;
    providing a second sheet of graphene perforated with plural apertures selected to allow the passage of water molecules and to disallow the passage of said selected second one of said unwanted ions, said apertures in said second sheet of graphene having a smaller diameter than said apertures in said first sheet of perforated graphene;

juxtaposing said first and second sheets of perforated graphene to thereby form a juxtaposed sheet with a first side defined by said first sheet of perforated graphene, a second side defined by said second sheet of perforated graphene, and a path for the flow of liquid therebetween;

applying said water carrying unwanted ions to said first side of said juxtaposed sheet, so that water molecules flow through said juxtaposed sheet and said path to said second side of said juxtaposed sheet in preference to ions, to thereby produce nominally deionized water; and collecting said nominally deionized water molecules from said second side of said juxtaposed sheet.

14. A method for deionizing water according to claim 13, wherein said step of providing a first sheet of perforated graphene and providing a second sheet of perforated graphene both include the step of applying oxidizer to a surface of an unperforated graphene sheet.

15. The method for deionizing water according to claim 13, further comprising:

providing each said graphene sheet with a thickness of approximately 2 nanometers.

16. A water deionizer, comprising:

a graphene sheet perforated with apertures dimensioned to allow the flow of water molecules and to disallow the flow of ions of a particular type;

a source of water laden with ions of said particular type; and a path for the flow of said water laden with ions of said particular type through said graphene sheet perforated with apertures.

17. A deionizer according to claim 16, further comprising a purge arrangement coupled to said path for the flow, for diverting said flow away from said graphene sheet perforated with apertures.

18. A deionizer according to claim 16, wherein said graphene sheet has a thickness of approximately 2 nanometers.

19. A separator, comprising:

a first graphene sheet perforated with apertures dimensioned to allow the flow of water molecules and to disallow the flow of ions of a first type;

a second graphene sheet perforated with apertures dimensioned to allow the flow of water molecules and to disallow the flow of ions of a second type, where said ions of said second type are smaller than said ions of said first type;

a source of water laden with ions of said first and second types;

a path for applying a flow of said water laden with ions of said first and second types to said first graphene sheet perforated with apertures dimensioned to disallow the flow of said ions of said first type, whereby (a) ions of said first type accumulate on an upstream side of said first graphene sheet perforated with apertures dimensioned to disallow the flow of said ions of said first type and (b) water laden with ions of said second type flows through said first graphene sheet perforated with apertures dimensioned to disallow the flow of said ions of said first type to a downstream side of said first graphene sheet perforated with apertures dimensioned to disallow the flow of said ions of said first type;

a path for applying a flow of said water laden with ions of said second type to an upstream side of said graphene sheet perforated with apertures dimensioned to disallow the flow of said ions of said first type, whereby (a) ions of said second type accumulate on an upstream side of said second graphene sheet perforated with apertures dimensioned to disallow the flow of said ions of said second type and (b) water free of said ions of said first and second types flows through said second graphene sheet perforated with apertures dimensioned to disallow the flow of said ions of said second type; and a collection arrangement coupled to receive said water free of said ions of said first and second types.

20. A separator according to claim 19, further comprising an ion collection arrangement coupled to receive said accumulation of one of said ions of said first type and said ions of said second type.

21. A separator according to claim 19, wherein each said graphene sheet has a thickness of approximately 2 nanometers.

* * * * *

UNITED STATES PATENT AND TRADEMARK OFFICE
Certificate

Patent No. 8,361,321 B2                                                                                   Patented: January 29, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John B. Stetson, New Hope, PA (US); Jonathan Mercurio, Moorestown, NJ (US); Alan Rosenwinkel, Haddonfield, NJ (US); Peter V. Bedworth, Palo Alto, CA (US); and Aaron L. Westman, Brewerton, NY (US).

Signed and Sealed this Sixteenth Day of September 2014.

BOBBY RAMDHANIE
*Supervisory Patent Examiner*
Art Unit 1779
Technology Center 1700